(12) United States Patent
Okano et al.

(10) Patent No.: US 9,688,151 B2
(45) Date of Patent: Jun. 27, 2017

(54) VEHICLE BRAKE DEVICE

(71) Applicants: ADVICS CO., LTD., Kariya, Aichi-pref (JP); TOYOTA JIDOSHA KABUSHIKI KAISHA, Toyota-shi, Aichi-ken (JP)

(72) Inventors: Takahiro Okano, Chiryu (JP); Masaki Ninoyu, Obu (JP); Daisuke Nakata, Seto (JP); Yusuke Kamiya, Okazaki (JP)

(73) Assignees: ADVICS CO., LTD., Kariya, Aichi-Pref (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 10 days.

(21) Appl. No.: 14/730,579

(22) Filed: Jun. 4, 2015

(65) Prior Publication Data

US 2015/0352960 A1 Dec. 10, 2015

(30) Foreign Application Priority Data

Jun. 9, 2014 (JP) ................................. 2014-118324

(51) Int. Cl.
| | | |
|---|---|---|
| G06F 7/70 | (2006.01) | |
| G06F 19/00 | (2011.01) | |
| G06G 7/00 | (2006.01) | |
| G06G 7/76 | (2006.01) | |
| B60L 7/26 | (2006.01) | |
| B60T 8/172 | (2006.01) | |
| B60T 1/10 | (2006.01) | |

(52) U.S. Cl.
CPC ........ *B60L 7/26* (2013.01); *B60T 1/10* (2013.01); *B60T 8/172* (2013.01); *B60T 2270/604* (2013.01)

(58) Field of Classification Search
CPC ....................................................... B60L 7/26
See application file for complete search history.

(56) References Cited

U.S. PATENT DOCUMENTS

2010/0270854 A1* 10/2010 Okano ..................... B60T 1/10
303/3

FOREIGN PATENT DOCUMENTS

| JP | 2009-154600 A | 7/2009 |
| JP | 2010-167972 A | 8/2010 |

* cited by examiner

*Primary Examiner* — Imran Mustafa
(74) *Attorney, Agent, or Firm* — Buchanan Ingersoll & Rooney PC

(57) ABSTRACT

The vehicle brake device includes a hydraulic pressure brake device including a timing judging portion, a pressure increasing judging portion and a raising control portion for adding a raising amount of pressure selected and set from a first value relating to an allowable range, a second value relating to a response delay by filling a wheel cylinder with the operating fluid and a third value relating to a control delay relative to an electromagnetic valve which controls the hydraulic pressure braking force to the target pressure corresponding to a judgment result by the pressure increasing judging portion, when the timing judging portion judges that a time is the timing of raising.

7 Claims, 7 Drawing Sheets

CYLINDER OPENING SIDE ←——————→ CYLINDER BOTTOM SURFACE SIDE

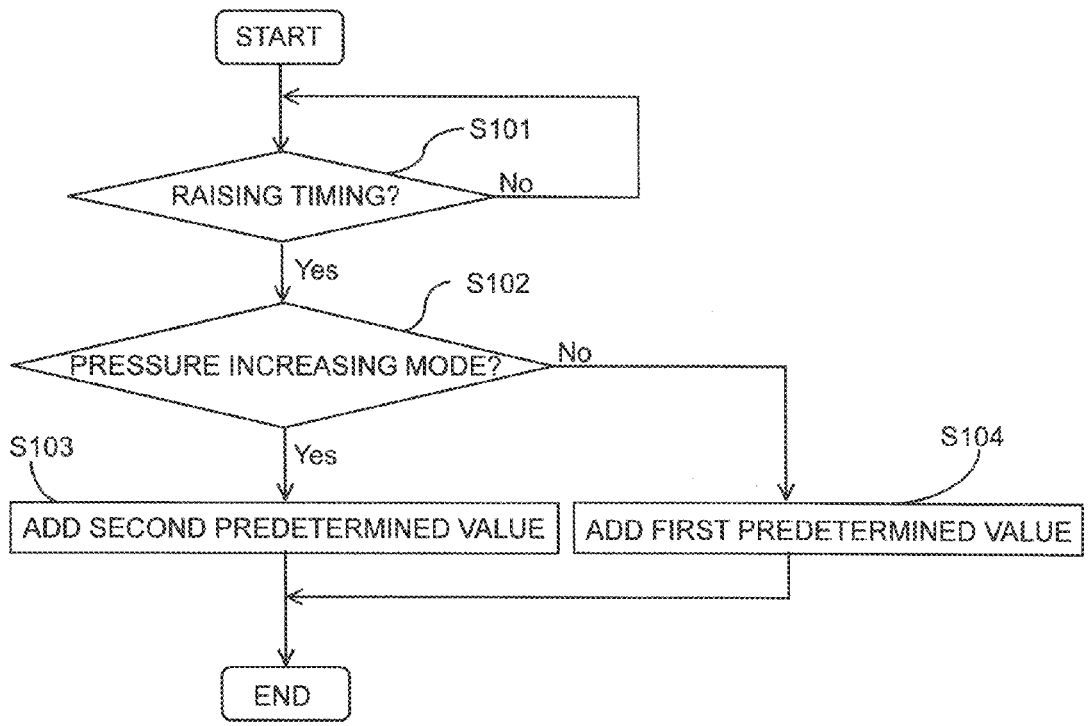
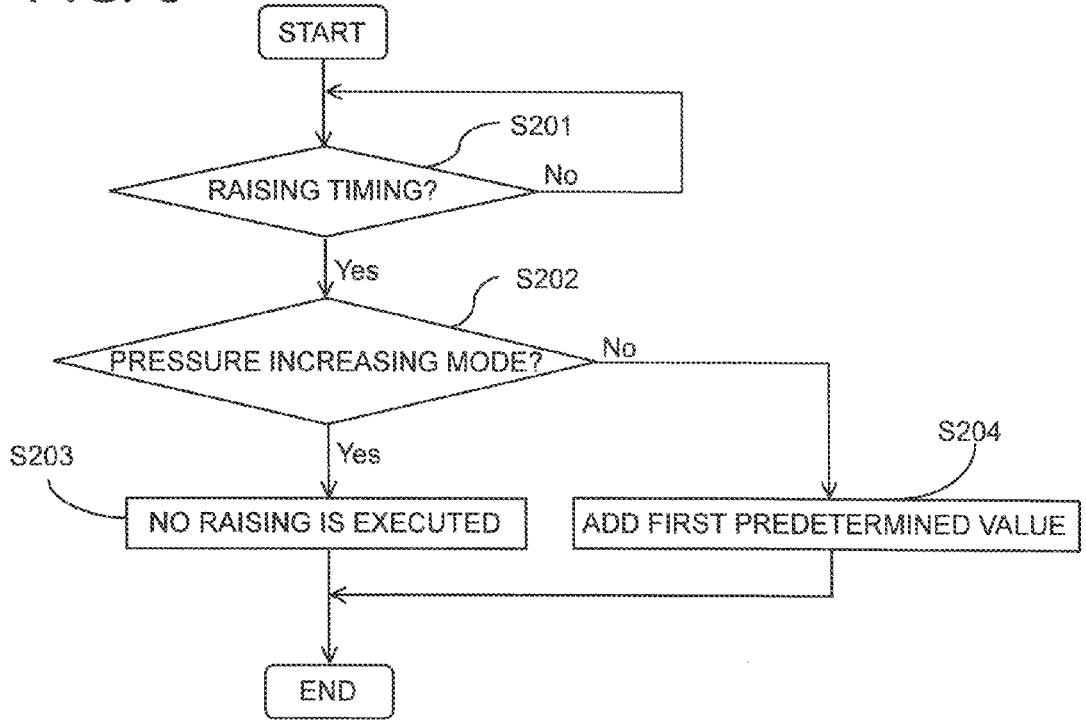

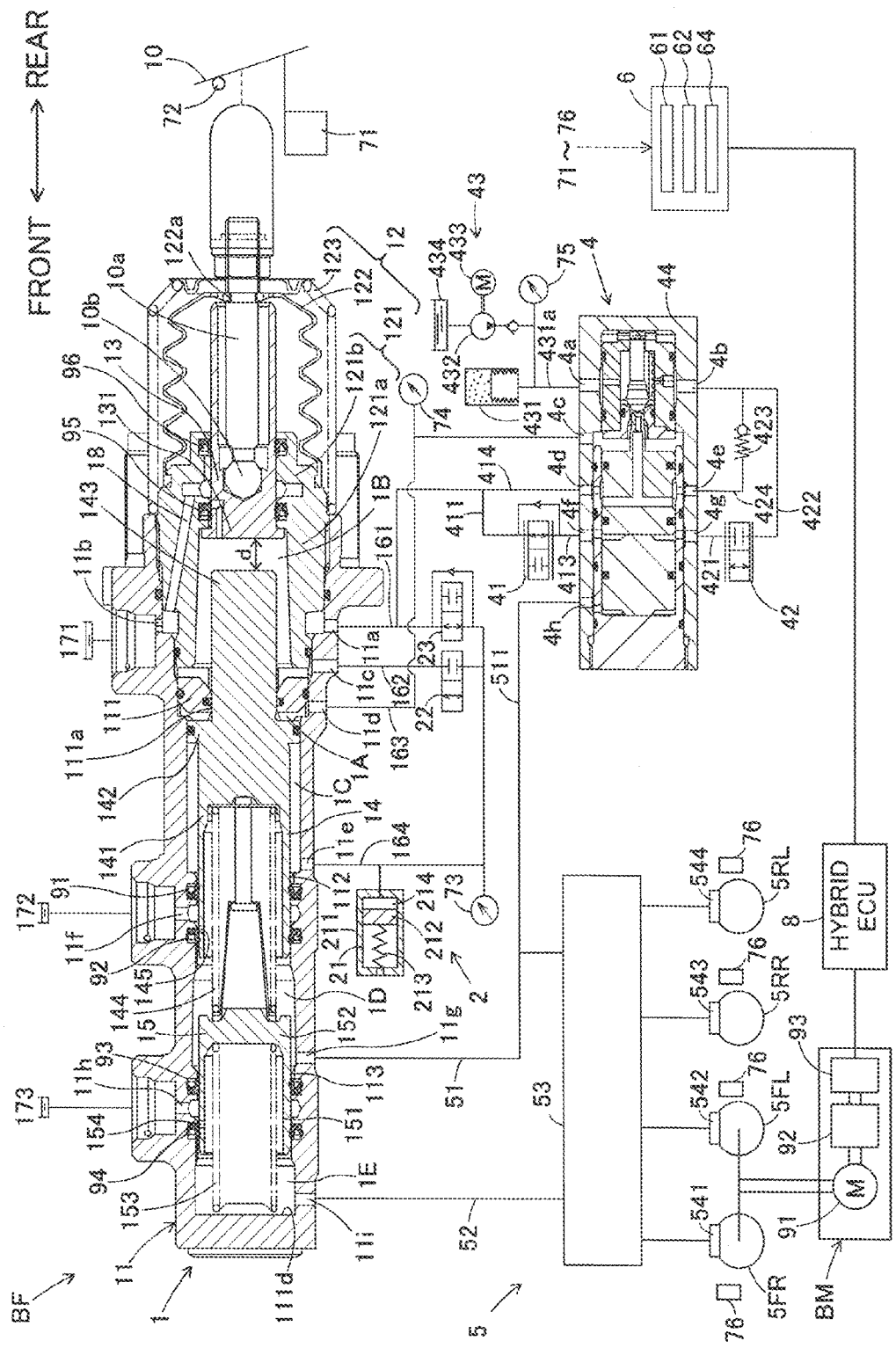

VEHICLE BRAKE DEVICE

CROSS REFERENCE TO RELATED APPLICATION

This application claims priority under 35 U.S.C. 119 with respect to Japanese Application No. 2014-118324 filed in Japan on Jun. 9, 2014, the entire content of which is herein incorporated by reference.

TECHNICAL FIELD

This invention relates to a vehicle brake device which utilizes both regeneration braking force and hydraulic pressure braking force.

BACKGROUND ART

Conventionally, in a vehicle, such as a hybrid vehicle having a motor drive device, a cooperative control (regeneration cooperative control) by the regeneration braking and the hydraulic pressure braking is performed in the braking operation. In view point of fuel efficiency, the regeneration braking is used in priority to the hydraulic pressure braking. The brake ECU calculates the braking force shortage by subtracting the regeneration braking force from the required braking force and then controls the hydraulic pressure braking force generating device to generate the calculated braking force shortage.

In a regeneration cooperative control, since there is a limit to generation of the regeneration braking force, a replacement, in which a transition is made from a braking state where the braking is performed mainly by the regeneration braking force to a braking state where the braking is performed by increasing the hydraulic pressure braking force, is executed to supplement the limited regeneration braking force. By this replacement execution of the braking state, a problem has been pointed out that a response delay may occur depending on the control performance characteristics of the hydraulic pressure brake such as setting of deadband. Such response delay may influence on the brake operation feeling for an operator of the vehicle. In more detail, sometimes such response delay may have the operator of the vehicle temporarily feel that the brakes are weak.

Accordingly, the brake control devices described in the patent literatures JP2009-154600A and JP2010-167972A have solved the above problem by raising the target pressure at the timing of execution of the replacement thereby to smoothly increase the actual pressure.

CITATION LIST

Patent Literature

Patent Literature 1: JP2009-154600A
Patent Literature 2: JP2010-167972A

SUMMARY OF INVENTION

Technical Problem(s)

However, it is considered that the response delay may be different in delay amount depending on the brake control state. In other words, in such conventional improved devices, there is still a room for improvement in view point of brake operation feeling given to the operator of the vehicle.

Accordingly, this invention was made in consideration with the above-mentioned situation and the objective of the invention is to provide a vehicle brake device which can execute a proper pressure raising control according to the brake control state, considering the improvements in brake operation feeling and vehicle controllability.

Solution to Problem(s)

The vehicle brake device according to a first aspect of the invention includes a hydraulic pressure brake device for controlling a hydraulic pressure braking force by controlling an actual pressure so that a deviation between a target pressure and the actual pressure becomes within an allowable range when the deviation is out of the allowable range and maintaining the actual pressure when the deviation is within the allowable range and a regeneration brake device for generating a regeneration braking force, wherein a required braking force is generated by using both the regeneration braking force and the hydraulic pressure braking force. The hydraulic pressure brake device includes a timing judging portion for judging whether or not a time is a timing of raising, a pressure increasing judging portion for judging whether or not the actual pressure is out of the allowable range and at the same time is smaller than the target pressure, and a raising control portion for adding a raising amount set according to a value or values selected from a first value relating to the allowable range, a second value relating to a response delay by filling a wheel cylinder with the operating fluid and a third value relating to a control delay relative to an electromagnetic valve which controls the hydraulic pressure braking force to the target pressure corresponding to a judgment result by the pressure increasing judging portion, when the timing judging portion judges that the time is the timing of raising.

According to the above feature, even if the time is the timing of raising, the raising amount is changed depending on the control state whether or not the control mode is pressure increasing mode. The pressure increasing mode is defined to be a control mode for increasing the hydraulic pressure braking force by increasing the actual pressure when the actual pressure is out of the allowable range and the actual pressure is smaller than the target pressure. During the pressure increasing mode being executed, the state of the device in which, for example, the electromagnetic valve is operated is different from the state thereof in the holding mode (a control mode for holding the actual pressure when the actual pressure is within the allowable range). Accordingly, the delay amount (response delay amount) of the hydraulic pressure control is different due to the difference in the state of the device. According to the first aspect of the invention above, the raising amount of pressure is added to the target pressure selected and set from the first, second and the third values depending on the state of the control. Thus the brake operation feeling can be improved and at the same time the brake control can be easily performed by changing the raising amount depending on whether or not the control mode is pressure increasing mode.

The brake device according to a second aspect of the invention is characterized in that in addition to the first aspect, the raising control portion adds the raising amount which is set to the second value to the target pressure when the pressure increasing judging portion judges that the actual pressure is out of the allowable range and is smaller than the target pressure and adds the raising amount which at least includes the first value when the pressure increasing judging portion does not judge that the actual pressure is out of the allowable range and is smaller than the target pressure.

According to thus structured invention, even if the time is judged to be the timing of raising, while the control mode is the pressure increasing mode, the raising amount which is set to the only selected second value is added to the target pressure. In the pressure increasing mode, the actual pressure is already out of the allowable range, and accordingly, the first value is not necessary to be added to the target pressure. Further, in the pressure increasing mode, the electromagnetic valve is already operated and accordingly, the third value which relates to a delay of applying electric current derived from the circuit structure and the operation delay by the valve opening and closing is not necessary to be added to the target pressure. Thus, according to the second aspect of the invention, since a proper raising amount is set, an improper generation of the braking force can be prevented and the brake operation feeling can be improved thereby.

The vehicle brake device according to a third aspect of the invention is characterized in that, in the first aspect, the raising control portion does not add the raising amount to the target pressure when the pressure increasing judging portion judges that the actual pressure is out of the allowable range and is smaller than the target pressure and adds the raising amount including at least the first value to the target pressure when the pressure increasing judging portion does not judge that the actual pressure is out of the allowable range and is smaller than the target pressure.

According to thus structured invention, even if the time is judged to be the timing of raising, while the control mode is in pressure increasing mode, the raising control is not executed. Accordingly, similar to the case in the second aspect, the first value and the third value are not necessary in the pressure increasing mode. Further, according to this third aspect, in the pressure increasing mode, a control is executed, in which the second value is not selected and the raising amount is not added (or the raising amount is set to be zero). By this structure, the control method is further facilitated and controllability is further improved. Since the mode is in pressure increasing mode, the hydraulic pressure braking force is further increased without pressure raising and worsening of brake feeling can be prevented.

The vehicle brake device according to a fourth aspect of the invention includes a hydraulic pressure brake device which controls a hydraulic pressure braking force by controlling an actual pressure so that a deviation between a target pressure and the actual pressure becomes within an allowable range when the deviation is out of the allowable range and maintaining the actual pressure when the deviation is within the allowable range and a regeneration brake device for generating a regeneration braking force, wherein a required braking force is generated by using both the regeneration braking force and the hydraulic pressure braking force. The hydraulic pressure brake device includes a timing judging portion for judging whether or not a time is the timing of raising, a requirement increasing judging portion for judging whether or not the required braking force is increasing, and a raising control portion for adding a raising amount set according to a value or values selected from a first value relating to the allowable range, a second value relating to a response delay by filling a wheel cylinder with the operating fluid and a third value relating to a control delay relative to an electromagnetic valve which controls the hydraulic pressure braking force to the target pressure corresponding to a judgment result by the requirement increasing judging portion, when the timing judging portion judges that the time is the timing of raising.

According to thus structured invention, the raising amount is changed depending on whether the required braking force is increasing or not. If the required braking force is judged to be increasing, the target pressure is increasing and the actual pressure is out of the allowable range thereby to have the brake control mode to be shifted to the pressure increasing mode. According to the fourth aspect of the invention, the same effects as those resulted from the first aspect can be expected.

The brake device according to a fifth aspect of the invention is characterized in that in the fourth aspect, the raising control portion adds the raising amount set to the second value to the target pressure when the requirement increasing judging portion judges that the required braking force is increasing and adds the raising amount which at least includes the first value to the target pressure when the requirement increasing judging portion does not judge that the required braking force is increasing. According to the fifth aspect of the invention, the same effects as those of the second aspect can be expected.

The vehicle brake device according to a sixth aspect of the invention is characterized in that, in the fourth aspect, the raising control portion does not add the raising amount to the target pressure when the requirement increasing judging portion judges that the required braking force is increasing and adds the raising amount including at least the first value to the target pressure when the requirement increasing judging portion does not judge that the required braking force is increasing. According to the sixth aspect of the invention, the same effects as those of the third aspect can be expected.

BRIEF EXPLANATION OF ATTACHED DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which:

FIG. 7 is a flowchart for explaining a raising control according to the first embodiment;

FIG. 8 is a flowchart for explaining a raising control according to a second embodiment;

FIG. 9 is a structural view explaining a structure of the vehicle brake device according to a third embodiment of the invention;

EMBODIMENTS FOR IMPLEMENTING INVENTION

Figure 1:
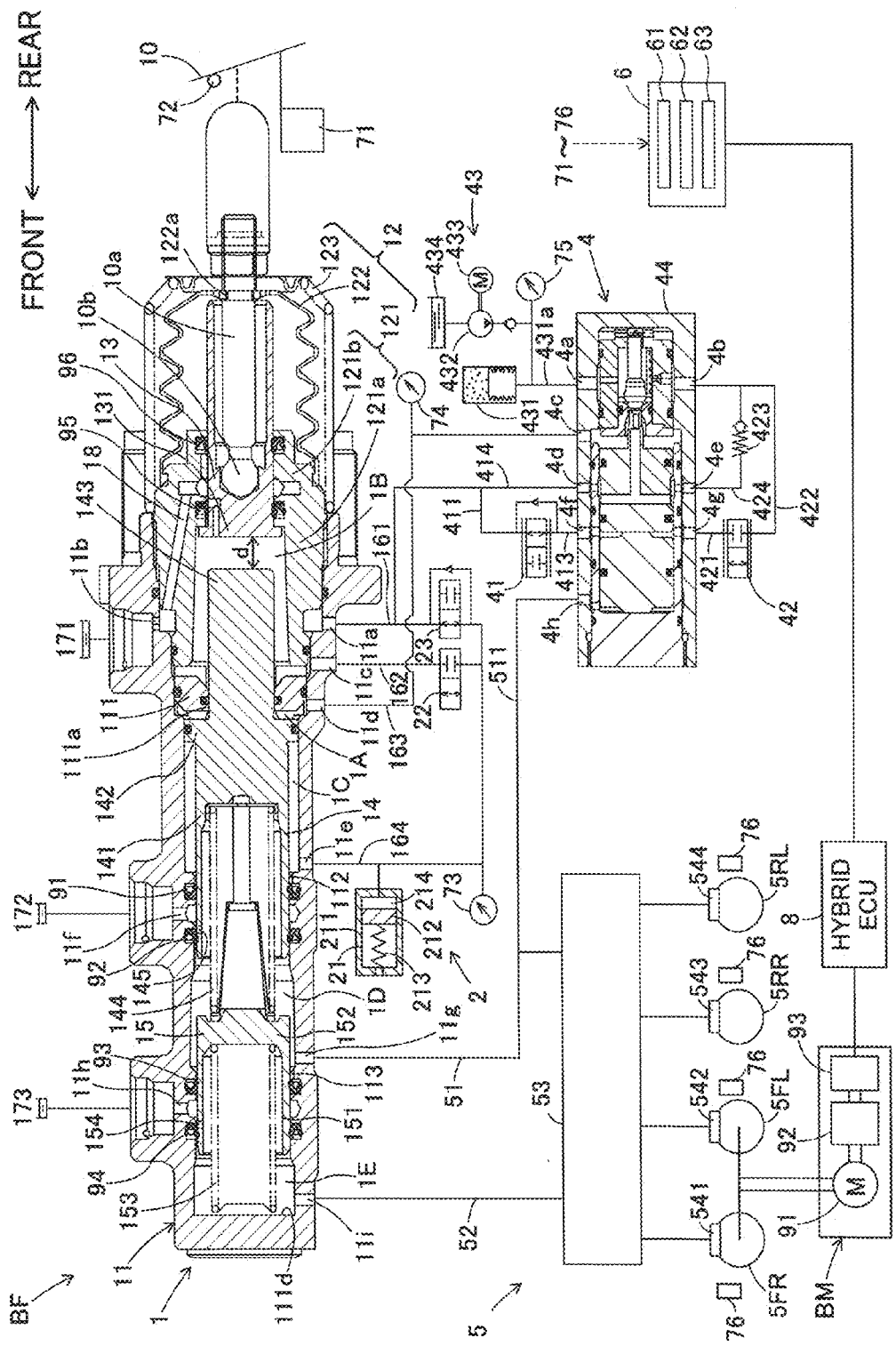
FIG. 1 is a structural view explaining a structure of the vehicle brake device according to a first embodiment of the invention.

The vehicle brake device according to the embodiments of the invention will be explained hereinafter with reference to the attached drawings. It is noted that in each embodiment, the same or similar components or portions are referenced with the same symbols or numerals in the attached drawings. The shape and the size of each component in the drawings, by which the structural explanation thereof will be made, are not necessarily accurate to those of the actual product.

First Embodiment

As shown in FIG. 1, the vehicle brake device is formed by a hydraulic pressure braking force generating device BF which generates a hydraulic pressure braking force and applies thereof to the vehicle wheels 5FR, 5FL, 5RR and 5RL, a regeneration braking force generating device BM for generating a regeneration braking force at drive vehicle wheels, such as, left and right front vehicle wheels 5FR and 5FL, a brake ECU 6 for controlling the hydraulic pressure braking force generating device BF and a hybrid ECU 8 for controlling the regeneration braking force generating device BM. The hydraulic pressure braking force generating device BF and the brake ECU 6 form the hydraulic pressure brake device and the regeneration braking force generating device BM and the hybrid ECU 8 form the regeneration brake device.

(Regeneration Cooperative Control)

The regeneration braking force generating device BM includes, for example, an alternative current (AC) synchronizing type motor 91 which is connected to the vehicle axle which connects both of the front wheels 5FR and 5FL and an inverter 92 which converts the AC electric power generated by the motor 91 into a direct current (DC) electric power to charge to a battery 93 and converts thus charged DC current into the AC current to supply to the motor 91.

The hybrid ECU 8 monitors the charge state of the battery 93 and executes regeneration braking control in cooperation with the brake ECU 6. In other words, by driving the motor 91 with utilizing the rotation force of the front wheels 5FR and 5FL, the hybrid ECU 8 generates the electricity and charges the battery 93 with the generated electricity. The regeneration braking force is generated by a resistance force of the motor 91 upon generation of the electricity. The hybrid ECU 8 calculates the value of the regeneration braking force and outputs the value to the brake ECU 6.

The brake ECU 6 and the hybrid ECU 8 are mutually communicably connected to each other and a cooperative control (regeneration cooperative control) is performed wherein the required braking force becomes equal to the sum of the target regeneration braking force generated by the regeneration braking force generating device BM and the target hydraulic pressure braking force generated by the hydraulic pressure braking force generating device BF.

According to the embodiments, the control by the brake ECU 6 and the hybrid ECU 8 performs a control that gives priority to using the regeneration braking force generating device BM. In other words, the brake ECU 6 calculates the target value of the regeneration amount (target regeneration amount) in response to the operation of the brake pedal 10 and the target regeneration amount is outputted to the hybrid ECU 8. The hybrid ECU 8 calculates the executable regeneration amount (execution regeneration amount) relative to the target regeneration amount and outputs the calculated execution regeneration amount to the brake ECU 6. Then the brake ECU 6 calculates the braking force shortage by subtracting the regeneration braking force corresponding to the execution regeneration amount from the required braking force and controls the hydraulic pressure braking force generating device BF to generate the braking force shortage. In other words, the brake ECU 6 sets the target hydraulic pressure braking force to the braking force shortage and sets the target servo pressure (corresponding to the "target pressure") based on the target hydraulic pressure braking force and executes the brake control, the detail of which will be explained later.

(Hydraulic Pressure Braking Force Generating Device BF)

The hydraulic pressure braking force generating device BF is as shown in FIG. 1, formed by a master cylinder 1, a reaction force generating device 2, a first control valve 22, a second control valve 23, a servo pressure generating device 4, a hydraulic pressure control portion 5, various sensors 71 through 76 and so on.

(Master Cylinder 1)

The master cylinder 1 is a portion which supplies the hydraulic pressure control portion 5 with the operating fluid in response to the operating amount of a brake pedal 10 (corresponding to the brake operating member) and is formed mainly by a main cylinder 11, a cover cylinder 12, an input piston 13, a first master piston 14 and a second master piston 15. The brake pedal 10 may be any type of brake operating portion by which an operator of the vehicle can perform braking operation. It is noted that one single master piston may be used instead of two.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof. The main cylinder 11 is provided therein at portions closer to the front end than the inner wall portion 111 with a small diameter portion 112 (rear) and a small diameter portion 113 (front), each of which inner diameter is set to be somewhat smaller than the inner diameter of the inner wall portion 111. In other words, the small diameter portions 112, 113 project from the inner circumferential surface of the main cylinder 11 having an inwardly annularly shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the flange portion 142 and the outer peripheral surface of the first master piston 14. The flange portion 142 of the first master piston 14 separates the rear chamber into a front portion and a rear portion and the front portion is defined to be a "second hydraulic pressure chamber 1C" and the rear portion is defined to be a "servo chamber 1A". A "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 13.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. "A second master chamber 1E" is defined by the inner peripheral surface and the inner bottom surface 111d of the main cylinder 11 and the pressurizing cylindrical portion 151 of the second master piston 15.

Ports 11a to 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the inner wall portion 111 and at the same time forward of the port 11c and the port 11d connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like (see black dot in the drawings) is appropriately provided within the master cylinder 1. The sealing members 91, 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members 95, 96 are provided between the input piston 13 and the cylindrical portion 121.

The stroke sensor 71 is a sensor which detects the operating amount (stroke amount) of the operation of the brake pedal 10 by a driver (operator) of the vehicle and transmits the detected result to the brake ECU 6. A brake stop switch 72 is a switch which detects whether the brake pedal 10 is depressed or not by using two signals (ON & OFF) and the detected signals are sent to the brake ECU 6. It may be possible to use an operating force sensor which detects an operating force (depression force) in response to the operation of the brake pedal 10 by the operator, instead of using the stroke sensor 71.

(Reaction Force Generating Device 2)

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location backward of the piston 212. The piston 212 is biased in the backward direction by a compression spring 213. The reaction force hydraulic pressure chamber 214 is connected to the second hydraulic pressure chamber 1C via a conduit 164 and the port 11e, and is connected further to the first control valve 22 and the second control valve 23 via the conduit 164.

(First Control Valve 22)

The first control valve 22 is an electromagnetic valve which is structured to close under non-energized state and opening and closing thereof is controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state and under this state communication between the first hydraulic pressure chamber 1B and the second hydraulic pressure chamber 1C is interrupted. Due to the closure of the first hydraulic pressure chamber 1B, the operating fluid is nowhere to flow and the input piston 13 and the first master piston 14 are moved integrally keeping the separation distance "d" therebetween to be constant. The first control valve 22 is open under the energized state and under such state, the communication between the first hydraulic pressure chamber 1B and the second hydraulic pressure chamber 1C is established. Thus, the volume change in the first hydraulic pressure chamber 1B and the second hydraulic pressure chamber 1C due to the advancement and retreatment of the first master piston 14 can be absorbed by the transferring of the operating fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state. On the other hand, while the first control valve 22 is in an open state, the pressure sensor 73 also detects the pressure (or the reaction force hydraulic pressure) in the hydraulically connected first hydraulic pressure chamber 1B. The pressure sensor 73 sends the detected signal to the brake ECU 6.

(Second Control Valve 23)

The second control valve 23 is an electromagnetic valve which is structured to open under a non-energized state and the opening and closing thereof is controlled by the brake ECU 6. The second control valve 23 is disposed between the conduit 164 and the conduit 161 for establishing communication therebetween. The conduit 164 is in communication with the second hydraulic pressure chamber 1C via the port 11e and the conduit 161 is in communication with the reservoir 171 via the port 11a. Accordingly, the second control valve 23 establishes communication between the second hydraulic pressure chamber 1C and the reservoir 171 under the non-energized state not to generate any reaction force hydraulic pressure but interrupts the communication therebetween to generate the reaction force hydraulic pressure under the energized state.

(Servo Pressure Generating Device 4)

The servo pressure generating device 4 is a device which generates a servo pressure and includes a pressure decreasing valve 41 (corresponding to the valve device), a pressure increasing valve 42 (corresponding to the valve device), a pressure supplying portion 43 and a regulator 44 and so on. The pressure decreasing valve 41 is a valve which opens under non-energized state (normally open valve) and the flow-rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 (low pressure source) via the conduits 411, 161 and ports 11a and 11b. It is noted here that the conduit 411 may be connected to a reservoir 434 (later described) instead of being connected to the reservoir 171. In such case the low pressure source corresponds to the reservoir 434. The reservoir 171 and the reservoir 434 may be formed to be a common reservoir.

The pressure increasing valve 42 is a valve which closes under a non-energized state (normally closed valve) and the flow-rate of the pressure increasing valve 42 is controlled by the brake ECU 6. One end of the pressure increasing valve 42 is connected to the conduit 421 and the other end thereof is connected to the conduit 422. Both pressure decreasing and increasing valves 41 and 42 correspond to a pilot hydraulic pressure generating device.

The pressure supplying portion 43 is a portion for supplying the regulator 44 with a highly pressurized operating fluid. The pressure supplying portion 43 includes an accumulator (high pressure source) 431, a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the pressurized operating fluid to the accumulator 431, the operating fluid being accumulated in the reservoir 434. The pressure sensor 75 provided in the conduit 431a detects the accumulator hydraulic pressure in the accumulator 431 and the detected signal is sent to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the pressurized operating fluid to the accumulator 431 in order to recover a pressure up to the value equal to or more than the predetermined value.

Figure 2:
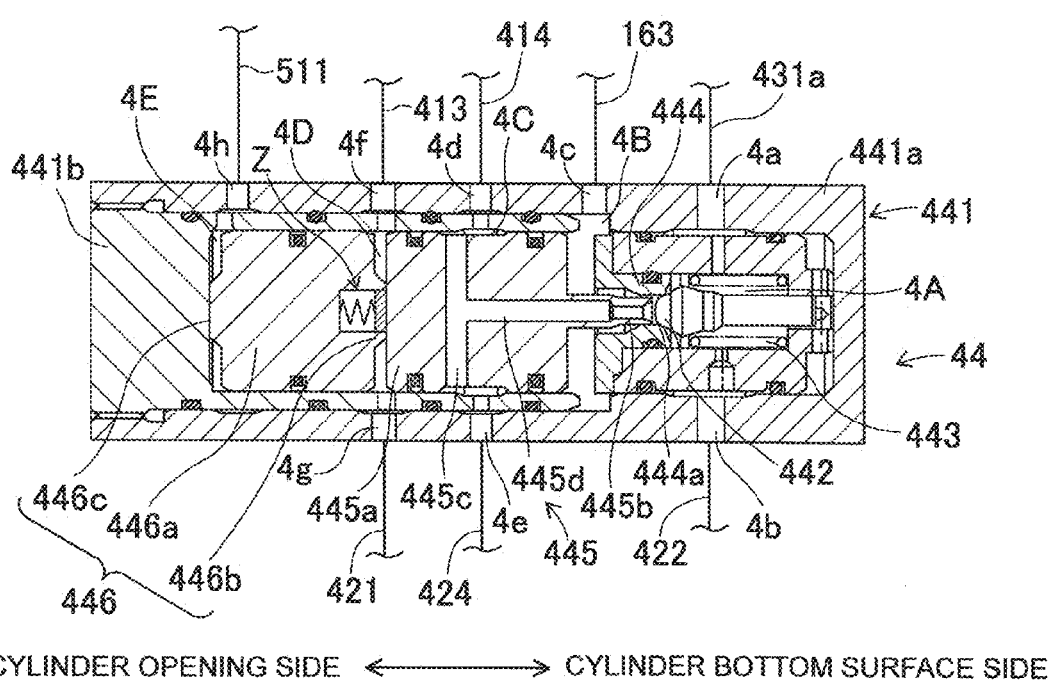
FIG. 2 is a cross sectional view of a regulator showing a detail structure thereof according to the first embodiment.

FIG. 2 is a partial cross sectional view illustrating a configuration of the inside of the regulator (corresponding to the pressure adjusting device) 44 forming the servo pressure generating device 4. As shown in the drawing, the regulator 44 (corresponds to the pressure adjusting device) includes a cylinder 441, a ball valve 442, a biasing portion 443, a valve seat portion 444, a control piston 445, a sub-piston 446 and so forth.

The cylinder 441 includes a cylinder case 441a formed in a substantially bottomed cylinder-shape having a bottom surface at one end thereof (at the right side in FIG. 2) and a cover member 441b closing an opening of the cylinder case 441a (at the left side thereof in FIG. 2). The cylinder case 441a is provided with a plurality of ports 4a through 4h through which the inside and the outside of the cylinder case 441a are in communication. The cover member 441b is formed to be in a substantially bottomed cylinder-shape and a plurality of ports is provided at each portion on the cylindrical portion facing to the corresponding ports 4d through 4h of the cylinder case 441a.

The port 4a is connected to the conduit 431a. The port 4b is connected to the conduit 422. The port 4c is connected to a conduit 163. The conduit 163 connects the servo chamber 1A and the outlet port 4c. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441a inside of the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder into the cylinder opening side and the cylinder bottom surface side. A through passage 444a through which the divided cylinder opening side and the cylinder bottom surface side are in communication is formed at a center of the valve seat portion 444. The valve seat portion 444 supports the ball valve 442 from the cylinder opening side by closing the through passage 444a by the biased ball valve 442. A valve seat surface 444b is formed at the opening portion of the cylinder bottom surface side of the through passage 444a such that the ball valve 442 is separated from or seated on (brought into contact with) a valve seat surface 444b.

A space defined by the ball valve 442, the valve seat portion 444 and the inner circumferential surface of the cylinder case 441a at the cylinder bottom surface side is referred to as "a first chamber 4A". The first chamber 4A is filled with the operating fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is arranged in the cylinder 441 in a coaxial and liquid-tight manner on the cylinder opening side of the valve seat portion 444, the main body portion 445a being slidably movable in the axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in FIG. 2) and both end portions thereof open at a circumferential surface of the main body portion 445a. A portion of an inner circumferential surface of the cylinder 441 corresponding to an opening position of the passage 445c is provided with the port 4d and is formed to be recessed, which recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends up to the inside of the main body portion 445a and is connected to the passage 445c.

A space defined by the end surface of the cylinder bottom surface side of the main body portion 445a, an outer surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C under a state that the projection portion 445b and the ball valve 442 is not contact with each other.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a the sub main body portion 446a being slidably movable in the axial direction.

The first projection portion 446b is formed in a substantially columnar shape having a smaller diameter than the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the and surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D" (corresponding to the "pilot chamber"). The first pilot chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 is a sensor that detects the servo pressure to be supplied to the servo chamber 1A and is connected to the conduit 163 as shown in FIG. 1. The pressure sensor 74 sends the detected signal to the brake ECU 6.

Thus, the regulator 44 includes the control piston 445 which is driven by the force differential between a force corresponding to the pressure in the first pilot chamber 4D (referred to also as "pilot pressure") and a force corresponding to the servo pressure. When the fluid amount flowing into or out from the first pilot chamber 4D increases, the displacement amount of the control piston 445 from the reference position where the force corresponding to the pilot pressure and the force corresponding to the servo pressure are balanced increases and accordingly, the fluid amount flowing into or out from the servo chamber 1A increases.

The regulator 44 is structured such that the more the fluid amount flowing into the first pilot chamber 4D from the accumulator 431 increases, the more the volume of the first pilot chamber 4D increases and accordingly, the more the fluid amount flowing into the servo chamber 1A from the accumulator 431 increases and such that more the fluid amount flowing out of the first pilot chamber 4D into the reservoir 171 increases, the less the volume of the first pilot chamber 1D decreases and accordingly, the more the fluid amount flowing into the reservoir 171 out of the servo chamber 1A increases.

It is noted that a damper device "Z" is provided at a wall portion of the sub-piton 446 facing to the first pilot chamber 4D. The damper device "Z" is structured as a stroke simulator and includes a piston portion being biased towards the first pilot chamber 4D by a biasing member. The rigidity of the first pilot chamber 4D is set by providing the damper device "Z".

(Hydraulic Pressure Control Portion 5)

The first and the second master chambers 1D and 1E which generate the master cylinder hydraulic pressure (master pressure) are connected to the wheel cylinders 541 through 544 via the conduits 51 and 52 and ABS 53 (Anti-lock Brake System). The wheel cylinders 541 through 544 form parts of the brake devices for the vehicle wheels 5FR through 5RL. In more specifically, the port 11g of the first master chamber 1D and the port 11i of the second master chamber 1E are connected to the well-known ABS 53 via the conduits 51 and 52, respectively. The ABS 53 is connected to the wheel cylinders 541 through 544 which operate the brake devices for braking the wheels 5FR through 5RL.

The ABS 53 includes a vehicle wheel speed sensor 76 (corresponding to the "detecting portion" and the "second sensor") installed at each vehicle wheel 5FR through 5RL for detecting the wheel speed of each vehicle wheel. The detection signal which indicates the wheel speed of the vehicle wheel detected by the vehicle wheel speed sensor 76 is outputted to the brake ECU 6.

By thus structured ABS 53, the brake ECU 6 executes an ABS control (Antilock Brake Control) by controlling the opening/closing change over operation of the holding valves and the pressure decreasing valves based on the master pressure, the state of the vehicle wheel speed and the front/rear acceleration and operating the motor when necessary, to adjust brake hydraulic pressure to the wheel cylinders 541 through 544, i.e., to adjust braking force to each of the vehicle wheels 5FR through 5RL. The ABS 53 is a device which supplies the wheel cylinders 541 through 544 with operating fluid supplied from the master cylinder 1 adjusting the amount of the fluid and the timing of supply based on the instructions by the brake ECU 6.

According to the brake control, which will be explained later, the hydraulic pressure supplied from the accumulator 431 of the servo pressure generating device 4 is controlled by the pressure increasing valve 42 and the pressure decreasing valve 41 to thereby generate the servo pressure in the servo chamber 1A. Thus, the first and the second master pistons 14 and 15 are advanced to pressurize the fluid in the first and the second master chambers 1D and 1E. The hydraulic pressures in the first and the second master chambers 1D and 1E are supplied to the wheel cylinders 541 through 544 as the master pressure from the respective ports 11g and 11i via the respective conduits 51 and 52 and the ABS 53. Thus, the hydraulic pressure braking force is applied to the vehicle wheels 4FR through 5RL.

(Brake ECU 6)

The brake ECU 6 is an electronic control unit and includes a microprocessor. The microprocessor includes an input/output interface, CPU, RAM, ROM and a memory portion such as non-volatile memory, connected with one another through bus communication.

The brake ECU 6 is connected to the various sensors 71 through 76 for controlling the electromagnetic valves 22, 23, 41 and 42 and the motor 433. The operating amount (stroke amount) of brake pedal 10 operated by the operator of the vehicle is inputted to the brake ECU 6 from the stroke sensor 71. A signal indicating whether or not the operation of the brake pedal 10 by the operator of the vehicle is performed is inputted to the brake ECU 6 from the brake stop switch 72. The reaction force hydraulic pressure of the second hydraulic pressure chamber 1C or the pressure of the first hydraulic pressure chamber 1B (or the reaction force hydraulic pressure) is inputted to the brake ECU 6 from the pressure sensor 73. The servo pressure supplied to the servo chamber 1A is inputted to the brake ECU 6 from the pressure sensor 74. The accumulator hydraulic pressure of the accumulator 431 is inputted to the brake ECU 6 from the pressure sensor 75 and the wheel speed of each of the vehicle wheels 5FR through 5RL is inputted to the brake ECU 6 from each of the vehicle wheel speed sensors 76.

(Brake Control)

The brake control by the brake ECU 6 will be explained hereinafter. The brake control means a normal brake control. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first and the second hydraulic pressure chambers 1B and 1C is established. Thus, in the brake control, the servo pressure in the servo chamber 1A is controlled by controlling the pressure decreasing valve 41 and the pressure increasing valve 42 under the state that the first control valve 22 is open and the second control valve 23 is closed. The pressure decreasing valve 41 and the pressure increasing valve 42 may be referred to as a valve device which adjusts the flow amount of the operating fluid flowing into or out of the first pilot chamber 1D. In this brake control, the brake ECU 6 calculates the "required braking force" of the operator of the vehicle based on the operating amount of the brake pedal 10 (displacement amount of the input piston 13) detected by the stroke sensor 71 or the operating force of the brake pedal 10 by the operator of the vehicle. Thus the target servo pressure is set based on the braking force shortage calculated by subtracting the regeneration braking force from the required braking force and the pressure decreasing valve 41 and the pressure increasing valve 42 are controlled such that the servo pressure actually detected as the actual servo pressure (corresponding to the actual pressure) is approximated to the target servo pressure.

In more detail, under the state that the brake pedal 10 is not depressed, the state is as explained above, that is the state that the ball valve 442 keeps the through passage 444a of the valve seat 444 to be closed. Further, the pressure decreasing valve 41 is in an open state and the pressure increasing valve 42 is in a closed state under the brake pedal 10 being not depressed. This means that the first chamber 4A and the second chamber 4B are hydraulically separated from each other.

The second chamber 4B is in communication with the servo chamber 1A via the conduit 163 to keep the hydraulic pressures in the two chambers 4B and 1A being mutually to an equal level. The second chamber 4B is in communication with the third chamber 4C via the passages 445c and 445d of the control piston 445 and accordingly, the second chamber 4B and the third chamber 4C are in communication with the reservoir 171 via the conduits 414 and 161. One side of the first pilot chamber 4D is closed by the pressure increasing valve 42, while the other side thereof is connected to the reservoir 171 through the pressure decreasing valve 41. The pressure in the first pilot chamber 4D and the pressure in the second chamber 4B are kept at the equal level. The second pilot chamber 4E is in communication with the first master chamber 1D via the conduits 511 and 51 thereby keeping the pressures of the two chambers 4E and 1D mutually equal to each other.

Under this state, when the brake pedal 10 is depressed, the brake ECU 6 controls the pressure decreasing valve 41 and the pressure increasing valve 42 based on the target friction braking force (braking force shortage), specifically based on the target servo pressure. In other words, the brake ECU 6 controls so as to make the pressure decreasing valve 41 close more and to make the pressure increasing valve 42 open more.

The communication between the accumulator 431 and the first pilot chamber 4D is established by the opening of the pressure increasing valve 42 and the communication between the first pilot chamber 4D and the reservoir 171 is interrupted by the closing of the pressure decreasing valve 41. The pressure in the first pilot chamber 4D can be increased by the highly pressurized operating fluid supplied from the accumulator 431. The control piston 445 is slidably moved towards the cylinder bottom surface side by the increase of the pressure in the first pilot chamber 4D. Thus the tip end of the projection portion 445b of the control piston 445 is brought into contact with the ball valve 442 to close the passage 445d by the ball valve 442 thereby interrupting the communication between the second chamber 4B and the reservoir 171.

By further sliding movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized operating fluid is supplied to the first chamber 4A from the accumulator 431, the hydraulic pressure in the second chamber 4B is also increased by the communication therebetween. As the separation distance between the ball valve 442 and the valve seat surface 444b becomes great, the fluid passage for the operating fluid becomes large and the pressure in the fluid passage downstream of the ball valve 442 becomes high. In other words, the larger the pressure (pilot pressure) in the first pilot chamber 4D, the longer the moving distance of the control piston 445 becomes and accordingly, the separation distance between the ball valve 442 and the valve seat surface 444b becomes large to thereby increase the hydraulic pressure (servo pressure) in the second chamber 4B.

The brake ECU 6 controls the pressure increasing valve 42 and the pressure decreasing valve 41 such that the more the displacement amount of the input piston 13 (operating amount of the brake pedal 10) detected by the stroke sensor 71 increases, the higher the pilot pressure in the first pilot chamber 4D becomes. In other words, the more the displacement amount of the input piston 13 (operating amount of the brake pedal 10), the higher the pilot pressure becomes and accordingly the servo pressure becomes higher as well. The servo pressure can be obtained by the pressure sensor 74 and can be converted into the pilot pressure.

Responding to the increase of the pressure in the second chamber 4B, the pressure in the servo chamber 1A which is in communication with the second chamber 4B increases. By the increase of the pressure in the servo chamber 1A, the first master piston 14 advances and then the pressure in the first master chamber 1D increases. Then, the second master piston 15 also advances and the pressure in the second master chamber 1E increases. By the increase of the pressure in the first master chamber 1D, highly pressurized brake fluid is supplied to the later explained ABS 53 and the second pilot chamber 4E. Although the pressure in the second pilot chamber 4E increases, since the pressure in the first pilot chamber 4D is also increased, the sub-piston 446 does not move. Thus, the highly pressurized operating fluid (master pressure) is supplied to the ABS 53 and the friction brake device is operated thereby to apply braking force to the vehicle. The force which advances the first master piston 14 in the "brake control" corresponds to the servo pressure.

When the braking operation is released, the pressure decreasing valve 41 is opened and the pressure increasing valve 42 is closed to establish the communication between the reservoir 171 and the first pilot chamber 4D. Accordingly, the control piston 445 is retreated and returns to the state before the depression of the brake pedal 10.

According to the brake control of this embodiment, the target servo pressure is set in response to the operation and the stroke amount of the brake pedal and the pressure decreasing and the increasing valves 41 and 42 are controlled to change the pilot pressure so that the servo pressure reaches to the target servo pressure. The target servo pressure is set according to a map or the like. According to this embodiment, an electromagnetic valve is used for the pressure decreasing valve 41 and the pressure increasing valve 42, the valve opening current of which is varied in response to the pressure differential between inlet port and the outlet port of the valve.

Figure 3:
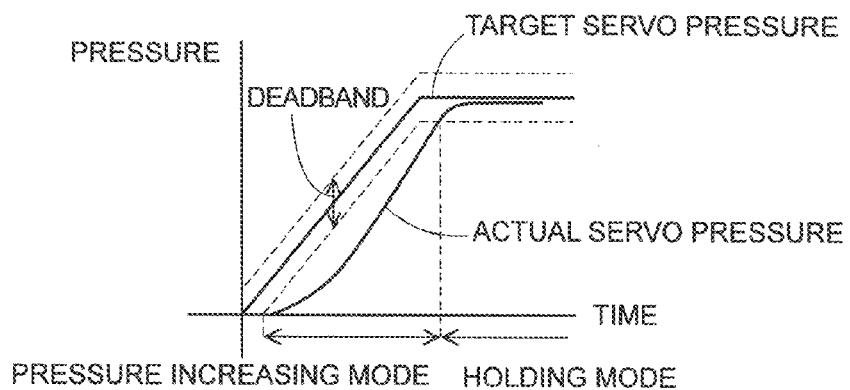
FIG. 3 is an explanatory view explaining the brake control (hydraulic pressure control) of the vehicle brake device according to the first embodiment.

As shown in FIG. 3, a predetermined deadband is provided by the brake ECU 6 relative to the target servo pressure. When the actual servo pressure becomes a value within a deadband (allowable range), the brake ECU 6 recognizes that the servo pressure has substantially reached the target servo pressure in executing a hydraulic pressure control. By setting the deadband, a generation of hunting phenomenon at the hydraulic pressure control can be minimized compared to the case that the target servo pressure is set to a single point.

In the brake control operation, the brake ECU 6 controls the actual servo pressure so that a deviation between the target servo pressure and the actual servo pressure becomes within the deadband (allowable range) when such deviation is out of the deadband and controls the actual servo pressure so that the actual servo pressure is maintained when the deviation is within the deadband. The brake ECU 6 executes a feedback control which controls the pressure decreasing valve 41 and the pressure increasing valve 42, by monitoring the value of the pressure sensor 74.

The brake ECU 6 executes a "pressure increasing mode" in which the actual servo pressure is controlled to be increasing towards the target servo pressure when the actual servo pressure is out of the deadband and at the same time is smaller than the target servo pressure. The brake ECU 6 executes a "pressure decreasing mode" in which the actual servo pressure is controlled to be decreasing towards the target servo pressure when the actual servo pressure is out of the deadband and at the same time is larger than the target servo pressure. Further, the brake ECU 6 executes a "pressure holding mode" in which the actual servo pressure is controlled to be maintained, when the actual servo pressure is within the deadband. The brake ECU 6 opens the pressure increasing valve 42 and closes the pressure decreasing valve 41 under the pressure increasing mode and closes the pressure increasing valve 42 and opens the pressure decreasing valve 41 under the pressure decreasing mode. The brake ECU 6 closes both pressure increasing valve 42 and the pressure decreasing valve 41 under the pressure holding mode.

(Raising Control)

As explained above, under the regeneration cooperative control being executed, the regeneration braking force is utilized in priority to the hydraulic pressure braking force, in view point of improvement of fuel efficiency. The braking force shortage relative to the required braking force is supplemented by the hydraulic pressure braking force. When the required braking force is relatively small, the required braking force can be covered by the regeneration braking force. However when the required braking force is relatively large, the required braking force is covered by both of the regeneration braking force and the hydraulic pressure braking force.

Figure 4:
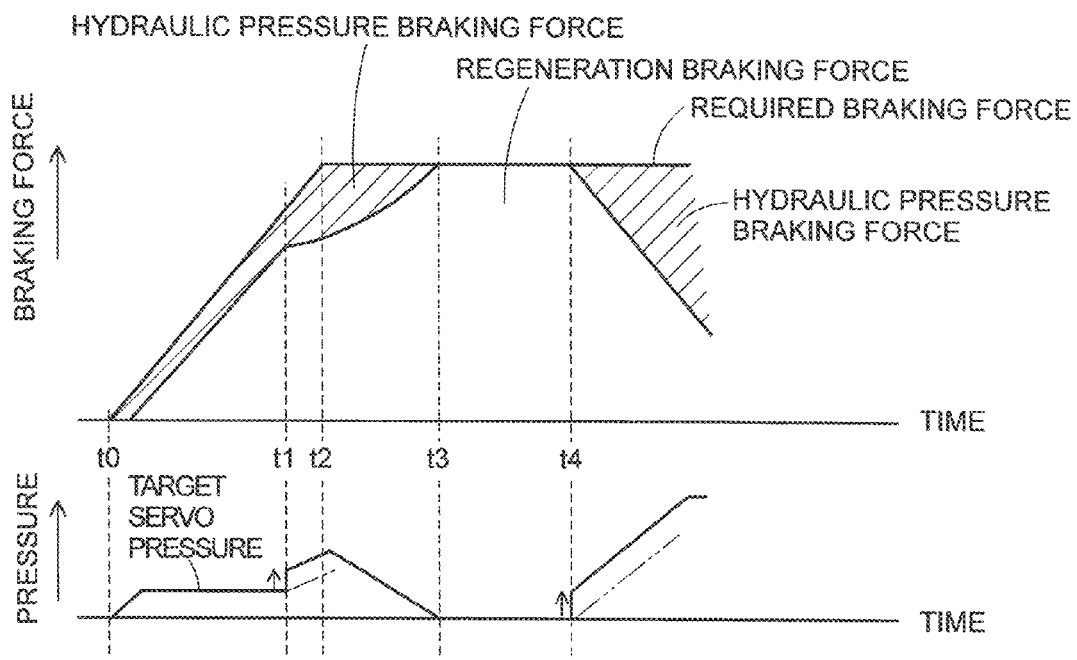
FIG. 4 is an explanatory view explaining an example of a timing of raising according to the first embodiment.

As shown in FIG. 4, at the early stage when the brake pedal 10 is depressed (time "t0" to "t1"), even if the required braking force can be covered by the regeneration braking force only, in view of the safety point, some amount of the hydraulic pressure braking force is generated and the braking operation is performed by applying mainly the regeneration braking force and the hydraulic pressure braking force as a supplemental. When the increase of the regeneration braking force cannot keep pace with the increase of the required braking force (time "t1" to "t3"), the brake control is transited from the state that the braking force is applied mainly by the regeneration braking force to the state that the hydraulic pressure braking force is increased. This brake control state transition is called as a "replacement (replacement control)".

At the time "t2", the required braking force becomes the maximum value and the regeneration braking force is gradually increased towards the time "t3" from time "t1" and at the time "t3" reaches the required braking force. At the time "t4", the vehicle wheel speed begins to decrease as the vehicle speed drops and at the same time the regeneration braking force begins to decrease. Accordingly, after the time "t4", the replacement control is executed again. As shown in FIG. 4, the replacement control execution starts at the time "t1" and at the time "t4". This replacement control is executed mainly when the regeneration braking force is insufficient to suffice the required braking force.

In this replacement control, the hydraulic pressure braking force is increased with a certain delay caused by the provision of deadband. Even if the target servo pressure is increased in order to increase the hydraulic pressure braking force, as long as the difference in pressure between the target servo pressure and the actual servo pressure does not exceed beyond the range of the deadband, the control mode is not changed to the pressure increasing mode and the actual servo pressure would not change. Accordingly, due to this phenomenon, conventionally, the raising of the target servo pressure is executed at the timing of replacement control.

The raising amount which is the amount of pressure added to the target servo pressure will be explained hereinafter. According to the embodiment, the raising amount is set according to a value or values selected from a first value relating to the deadband, a second value relating to the response delay by filling the wheel cylinders 541 through 544 with the operating fluid and a third value relating to the control delay relative to the electromagnetic valve (here, corresponding to the pressure decreasing valve 41 and the pressure increasing valve 42) which controls the hydraulic pressure braking force.

The first value is set to the value which is the sum of a half width of the deadband (maximum deviation between the actual servo pressure and the target servo pressure within the deadband) and a subtracted value obtained by subtracting the target servo pressure from the actual servo pressure. If the actual servo pressure is greater than the target servo pressure, the above subtracted value becomes a positive value and the first value becomes greater than a half width of the deadband. In this case, in order to make the brake control become the pressure increasing mode, the target servo pressure should be increased to exceed the actual servo pressure, and accordingly, the first value becomes a relatively large value. On the other hand, if the actual servo pressure is smaller than the target servo pressure, the calculated value becomes the negative value and the first value becomes smaller than a half width of the deadband. In this case, in order to make the brake control become the pressure increasing mode, a relatively small amount of pressure raising would be sufficient since the actual servo pressure is smaller than the target servo pressure. The first value is a minimum value to have the actual servo pressure being in the deadband to be smaller than the target servo pressure and to be out of the deadband.

The second value is a value corresponding to a consumed hydraulic fluid amount consumed at the wheel cylinders 541 through 544 and by which the response delay caused by filling the wheel cylinders 541 through 544 with the operating fluid is compensated. Generally, the wheel pressure is increased by the filling of the wheel cylinders 541 through 544 with the operating fluid which is introduced thereinto through the ABS 53 and the like by the increase of the master pressure. The master pressure is increased by the increase of the servo pressure owing to the increase of the pilot pressure. The second value is thus determined to the value necessary for compensating the delay caused by the time to fill the wheel cylinders with the operating fluid. The second value is determined by the experiment or the simulation calculation.

The third value is a value which needs to compensate the delay of operation of the pressure decreasing and the increasing valves 41 and 42. The pressure decreasing and the increasing valves 41 and 42 are the electromagnetic valves (solenoid valve) whose opening and closing operations are controlled by the balancing relationship among the electromagnetic driving force generated by applying the coil with electric current therethrough, a biasing force of the spring and the pressure differential generating force generated corresponding to the pressure differential between the inlet and outlet ports of the electromagnetic valve. Upon generation of the electromagnetic driving force, a control delay of applying electric current to the coil is generated owing to the circulate structure (ON/OFF operation of relays or the like in the circuit). Particularly, the delay is generated when the applied electric current is increased from zero (0). Further, the valve opening and closing operation takes a response time and particularly, transition from the closed state to the open state generates a response delay. Accordingly, the third value is set to the value by which the control delay of applying electric current and the valve operation delay are compensated. The third value is determined by an experimental work or a simulation calculation.

Figure 5:
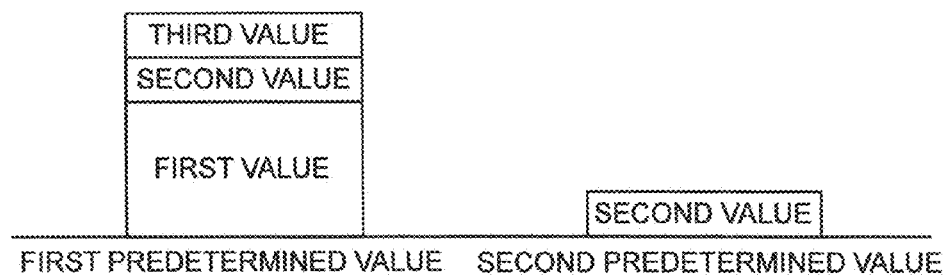
FIG. 5 is an explanatory view explaining a raising amount of the vehicle brake device according to the first embodiment.

The brake ECU 6 memorizes a first raising amount and a second raising amount set based on the first, the second and the third values. As shown in FIG. 5, according to this embodiment the first raising amount is set to be the sum of the first, the second and the third values. The second raising amount is set to be the second value. Each raising amount is set according to a value or values selected from the first, the second and the third values. Such selection may be made in advance as this embodiment, but may be selected on a case-by-case basis according to the situation of the brake control.

The brake ECU 6 includes, a timing judging portion 61, a pressure increasing judging portion 62 and a raising control portion 63, each of which performs respective function. The timing judging portion 61 communicates with the hybrid ECU 8 and judges whether or not a change ratio (inclination of change) of the regeneration braking force is decreasing and the braking force shortage is shifted to an increasing side. The timing judging portion 61, for example, detects a timing at which the inclination of increasing change (change ratio) changes from "1" to "0.5" and the braking force shortage (target hydraulic pressure braking force) changes from the constant amount of "1" before the timing to the amount of "2" after the timing. It is noted that if the inclination of the change of the regeneration braking force changes from "0" to "−1", the change ratio of the regeneration braking force decreases. The timing judging portion 61 judges whether or not the time is the timing of the raising. As shown in FIG. 4, the timing judging portion 61 judges that the time "t1" and the time "t4" are the timing of raising. This timing of raising overlaps with the timing of the replacement.

The pressure increasing judging portion 62 judges whether or not the actual servo pressure is out of the deadband and is smaller than the target servo pressure based on the measurement value of the pressure sensor 74. In other words, the pressure increasing judging portion 62 judges whether the brake control is the pressure increasing mode or not.

The raising control portion 63 adds the first raising amount or the second raising amount to the target servo pressure based on the judgement of each judging portion 61 and 62. In more detail, when the timing judging portion 61 has judged that the time is the timing of raising, the raising control portion 63 adds the first raising amount to the target servo pressure if the pressure increasing judging portion 62 does not judge that the control mode is the pressure increasing mode and adds the second raising amount to the target servo pressure if the pressure increasing judging portion 62 judges that the control mode is the pressure increasing mode. As shown in FIG. 4, at the time "t1", if the control mode is the pressure increasing mode, the target servo pressure is raised by the first raising amount and if the control mode is the pressure increasing mode, the target servo pressure is raised by the amount corresponding to the second raising amount.

Figure 6:
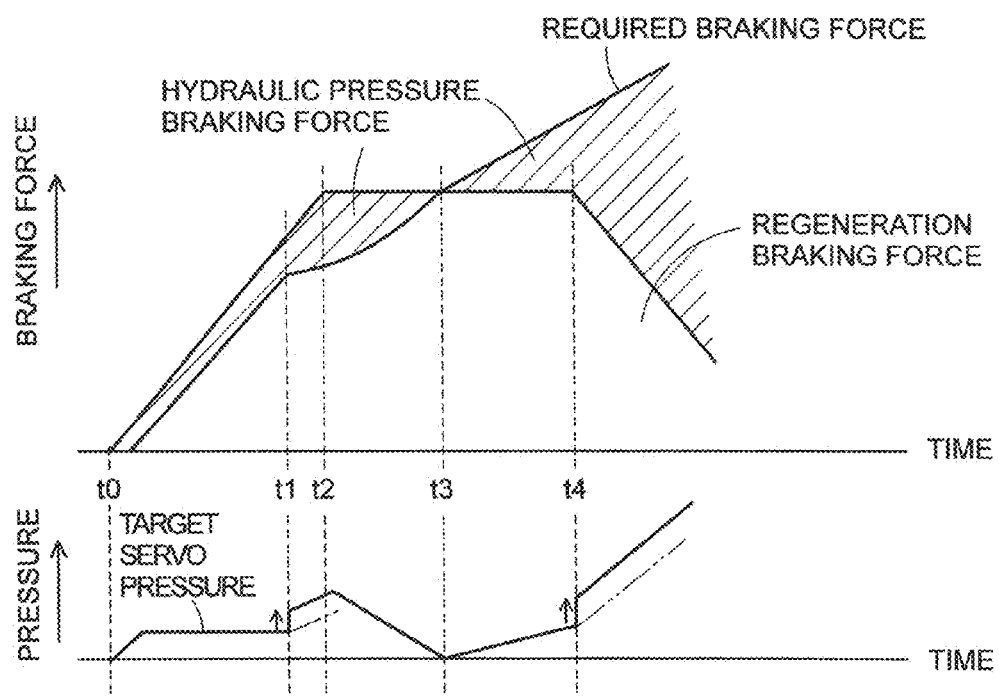
FIG. 6 is another explanatory view explaining an example of a timing of raising according to the first embodiment.

Next, the case that the operator of the vehicle additionally depresses the brake pedal 10 in mid-course of brake operation, as shown in FIG. 6 will be explained. In FIG. 6, the time "t1" is judged to be the timing of raising and if the control mode is the pressure increasing mode, the second raising amount is added to the target servo pressure and if the control mode is not the pressure increasing mode, the first raising amount is added to the target servo pressure. During the time between "t2" and "t3", the required braking force remains to be constant and, at the time "t3", the brake pedal 10 is additionally depressed, and then the required braking force is increased after the time "t3". Since at the time "t3", the regeneration braking force becomes constant (maximum value) and the change ratio thereof is not decreasing, the timing judging portion 61 does not judge that the time "t3" is the timing of raising.

At the time "t4", the regeneration braking force begins to decrease as the drop of the vehicle speed. At the time "t4", the inclination of the change of the regeneration braking force decreases from zero to minus one (−1). Accordingly, the timing judging portion 61 judges that the time "t4" is the timing of raising. It is noted that from the time "t3" to the time "t4", since the required braking force has been increasing and the regeneration braking force has been kept constant, the target hydraulic pressure braking force has been increasing and the target servo pressure has been increasing. Accordingly, according to the embodiment, at the time "t4", the actual servo pressure positions out of the deadband and at the same time the actual servo pressure is judged to be smaller than the value of the target servo pressure. In other words, the control mode becomes the pressure increasing mode at the time "t4". The timing judging portion 61 judges that the time "t4" is the timing of raising and the pressure increasing judging portion 62 judges that the control mode is the pressure increasing mode. Thus, at the time "t4", the raising control portion 63 adds the second raising amount (i.e., the second value only) to the target servo pressure.

The flow of raising control by the brake ECU 6 will be explained with reference to FIG. 7. As shown in FIG. 7, when the timing judging portion 61 judges that the time is the timing of raising (S101; YES), the pressure increasing judging portion 62 judges whether the control mode is the pressure increasing mode or not (S102). When the control mode is judged to be the pressure increasing mode (S102; YES), the raising control portion 63 adds the second raising amount to the target servo pressure (S103) to perform raising. When the control mode is not judged to be the pressure increasing mode (S102; NO), the raising control portion 63 adds the first raising amount to the target servo pressure (S104) to perform raising.

The advantageous effects of the first embodiment will be explained. When the brake control is in the pressure increasing mode, the pressure increasing valve 42 has been already in open state. It is considered that the response time for changing the opening degree under the valve being open, is approximately zero (0). Further, since the coil of the pressure increasing valve 42 has been already applied with the electric current for opening the valve and the circuit structure (relays or the like) is in connected state, the control delay of the circuit structure when increasing the electric current is also approximately zero (0). Still further, since the actual servo pressure has been out of the deadband in the pressure increasing mode, the raising amount which relates to the range of the deadband, i.e., the first value is not necessary. Therefore, the first value and the third value relating to the control delay of the coil and the valve are not necessary to be included in the raising amount in the pressure increasing mode.

According to the first embodiment, at the raising timing, when the control is in the pressure increasing mode, since the only second value relating to the delay of filling of operating fluid is added to the target servo pressure as the raising amount, an unusual braking force generation can be prevented and further, more proper responsiveness can be achieved. Still further, the raising control is performed only by adding the first or the second raising amount and therefore, a complicated control can be avoided. Accordingly, according to the embodiment, a proper raising control can be performed depending on the state of control, in view point of the brake operation feeling and the controllability.

Second Embodiment

The brake device for the vehicle according to the second embodiment is different in the raising operation in the pressure increasing mode from the first embodiment and accordingly, only such different points will be explained hereinafter.

When the timing judging portion 61 judges that the time is the timing of raising, the raising control portion 63 according to the second embodiment adds the first raising amount (sum of the first, the second and the third values) to the target servo pressure if the pressure increasing judging portion 62 does not judge that the control mode is the pressure increasing mode and executes no raising control if the pressure increasing judging portion 62 judges that the control mode is the pressure increasing mode. In other words, the raising control portion 63 does not add the raising amount to the target servo pressure in the pressure increasing mode.

For example, in FIG. 6, the raising control portion 63 does not execute the raising control at the time "t1" and at the time "t4" if the brake control is in pressure increasing mode and executes the raising control at the time "t1" and at the time "t4" by adding the first raising amount to the target servo pressure if the brake control is not in pressure increasing mode. The flow of raising control according to the second embodiment will be explained. As shown in FIG. 8, when the timing judging portion 61 judges that the time is the timing of raising (S201; YES), the pressure increasing portion 62 judges whether the control mode is the pressure increasing mode or not (S202). If judged to be the pressure increasing mode (S202; YES), the raising control portion 63 prohibits the raising control (S203). If not judged to be the pressure increasing mode (S202; NO), the raising control portion 63 adds the first raising amount to the target servo pressure to execute the raising control (S204).

It is advantageous to simplify the brake control by not executing raising control and thereby to make a removing control (control which finally reduces the raising amount to zero) unnecessary rather than to compensate only the delay caused by the filling of the operating fluid, in view of control process simplification in the pressure increasing mode. Since the control is in the pressure increasing mode, the delay by the filling of the operating fluid is suppressed to the minimum value. According to the second embodiment, an unusual generation of braking force can be prevented and yet the simplified brake control can be achieved. In other words, according to the second embodiment, a raising control suitable for the state of braking can be performed in view point of the brake operation feeling and the controllability.

It is noted that the brake ECU 6 according to the second embodiment may memorize a fourth value which corresponds to the "zero raising amount". In this case, the second raising amount is set to be the fourth value according to this second embodiment and the second raising amount is added to the target servo pressure in the pressure increasing mode. At the raising timing, the raising control portion 63 adds the raising amount set according to a value or values selected from the first value, the second value, the third value and the fourth value which is the "zero raising amount" to the target pressure in response to the judgment result of the pressure increasing judging portion 62.

Third Embodiment

The vehicle brake device according to the third embodiment is different from the first embodiment in the structure that a requirement increasing judging portion 64 judges whether the raising control is to be executed or not instead of the pressure increasing judging portion 62. Accordingly, only the different points will be explained hereinafter.

The brake ECU 6 of the third embodiment is provided with the timing judging portion 61, the requirement increasing judging portion 64 and the raising control portion 63. The requirement increasing judging portion 64 judges whether the required braking force is increasing or not (whether the inclination of the change of the required braking force is positive value or not).

When the timing judging portion 61 has judged that the time is the timing of raising, the raising control portion 63 adds the second raising amount to the target servo pressure if the requirement increasing judging portion 64 judges that the required braking force is increasing (at the time "t1" and at the time "t4" in FIG. 6) and adds the first raising amount to the target servo pressure if the requirement increasing judging portion 64 does not judge that the required braking force is increasing (at the time "t4" in FIG. 4).

Figure 10:
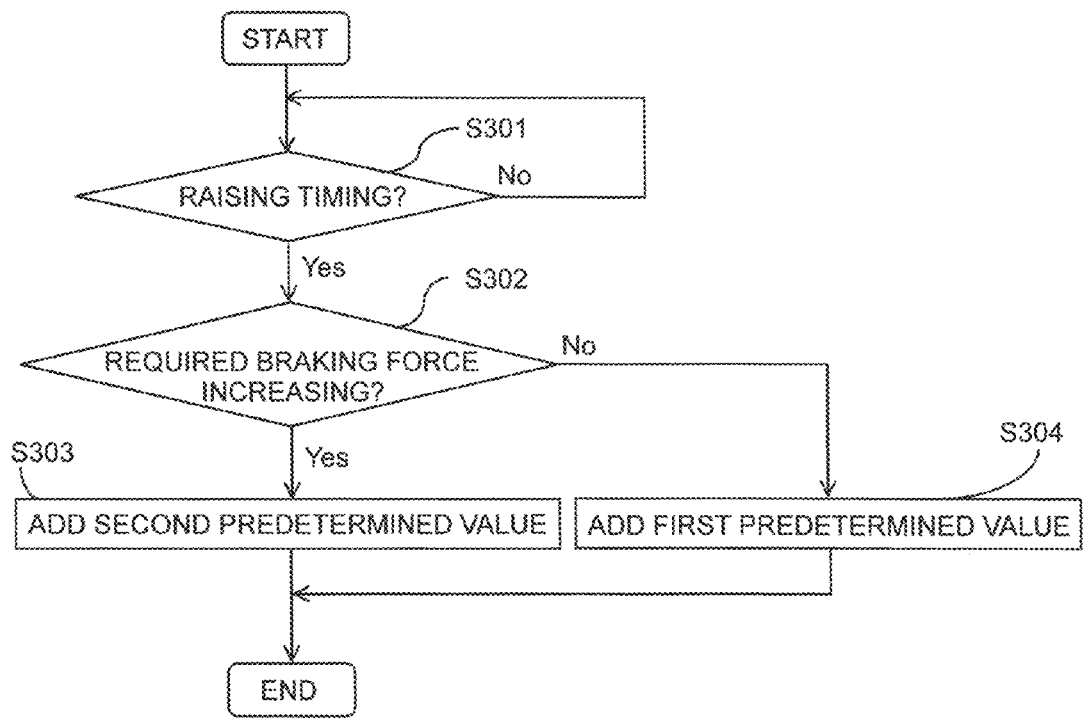
FIG. 10 is a flowchart for explaining a raising control according to a third embodiment.

The flow of raising control according to the third embodiment will be explained. As shown in FIG. 10, when the timing judging portion 61 judges that the time is the timing of raising (S301; YES), the requirement increasing judging portion 64 judges whether the required braking force is increasing or not (S302). When the required braking force is judged to be increasing (S302; YES), the raising control portion 63 adds the second raising amount to the target servo pressure (S303). When the required braking force is not judged to be increasing (S302; NO), the raising control portion 63 adds the first raising amount to the target servo pressure (S304). Thus the advantageous effects will be achieved as similar to those of the first embodiment. It is also noted that when the time is the timing of raising and the required braking force is increasing, as shown in FIG. 4 at the time "t1" and in FIG. 6 at the time "t1" and at the time "t4", most of the cases the pressure increasing valve 42 has been already in open state and accordingly, there needs no addition of the third value to the target pressure and accordingly, more proper raising control can be performed.

On the other hand, the brake ECU 6 of the third embodiment may be structured not to execute raising control instead of adding the second raising amount to the target servo pressure, as similar to the structure in the second embodiment. In other words, when the timing judging portion 61 judges that the time is the timing of raising, the raising control portion 63 does not execute the raising control (raising amount is not added to the target servo pressure) if the requirement increasing judging portion 64 judges that the required braking force is increasing (at the time "t1" and at the time "t4" in FIG. 6) and adds the first raising amount to the target servo pressure if the requirement increasing judging portion 64 does not judge that the required braking force is increasing (at the time "t4" in FIG. 4).

Figure 11:
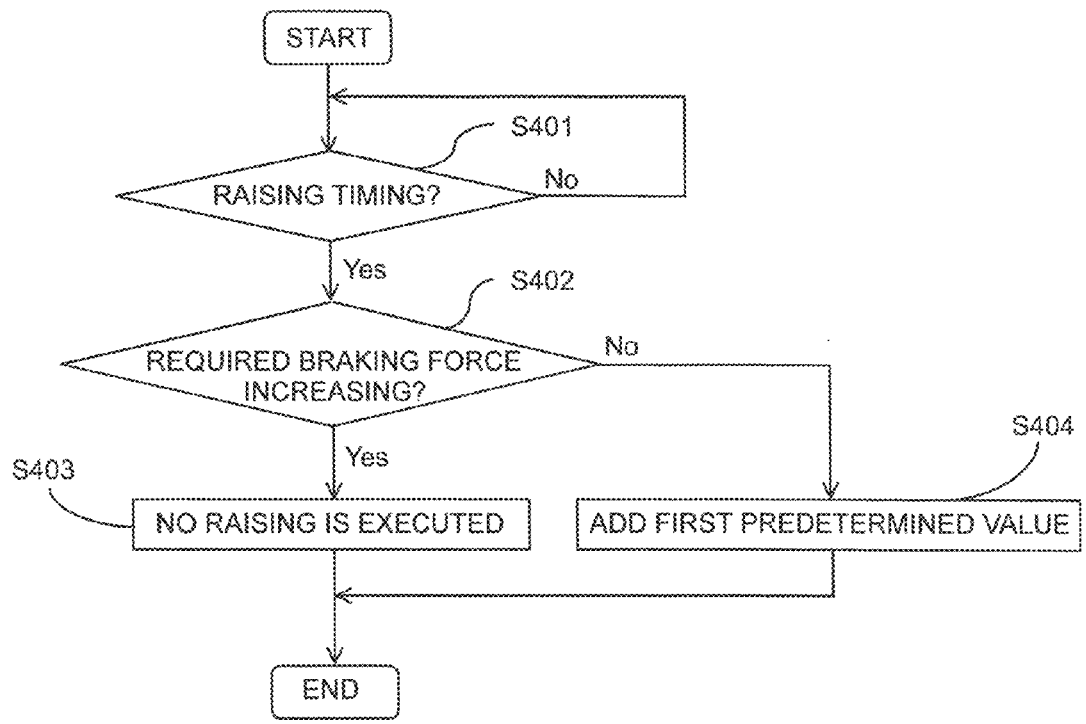
FIG. 11 is a flowchart for explaining a raising control according to a fourth embodiment.

In other words, as shown in FIG. 11, when the timing judging portion 61 judges that the time is the timing of raising (S401; YES), the requirement increasing judging portion 64 judges whether the required braking force is increasing or not (S402). If the required braking force is judged to be increasing (S402; YES), the raising control portion 63 does not execute raising (or add the zero raising amount). (S403). If the required braking force is not judged to be increasing (S402; NO), the raising control portion 63 executes raising control by adding the first raising amount to the target servo pressure (S404). Thus, the advantageous effects can be achieved as similar to those in the second embodiment.

Other Modified Embodiments

It is noted that the invention is not limited to the embodiments explained above. For example, the first raising amount may be set to a value including at least the first value. Or the first raising amount may be set to be the first value only, the sum of the first and the second values, or the sum of the first and the third values. The raising amount may be set to according to a value or values selected from the first through third values (or the first through the fourth values) depending on the control state.

Obviously, numerous modifications and variations of the present invention are possible in light of the above teachings. It is therefore to be understood that within the scope of the appended claims, the present invention may be practiced otherwise than as specifically described herein.

The invention claimed is:
1. A vehicle brake device comprising:
   a hydraulic pressure brake device for controlling a hydraulic pressure braking force by controlling an actual pressure so that a deviation between a target pressure and the actual pressure becomes within an allowable range when the deviation is out of the allowable range and maintaining the actual pressure when the deviation is within the allowable range; and
   a regeneration brake device for generating a regeneration braking force, wherein a required braking force is generated by using both the regeneration braking force and the hydraulic pressure braking force, the hydraulic pressure brake device including:
   a timing judging portion for judging whether or not a time is a timing of raising;
   a pressure increasing judging portion for judging whether or not the actual pressure is out of the allowable range and at the same time is smaller than the target pressure;
   a selecting portion for selecting a raising amount set according to a value or values selected from a first value relating to the allowable range, a second value relating to a response delay by filling a wheel cylinder with the operating fluid and a third value relating to a control delay relative to an electromagnetic valve which controls the hydraulic pressure braking force to the target pressure corresponding to a judgment result by the pressure increasing judging portion; and a raising control portion for adding the raising amount selected by the selecting portion to the target pressure when the timing judging portion judges that the time is the timing of raising.

2. The vehicle brake device according to claim 1, wherein the raising control portion adds the raising amount set to the second value to the target pressure when the pressure increasing judging portion judges that the actual pressure is out of the allowable range and is smaller than the target pressure and adds the raising amount which at least includes the first value when the pressure increasing judging portion does not judge that the actual pressure is out of the allowable range and is smaller than the target pressure.

3. The vehicle brake device according to claim 1, wherein the raising control portion does not add the raising amount to the target pressure when the pressure increasing judging portion judges that the actual pressure is out of the allowable range and is smaller than the target pressure and adds the raising amount including at least the first value to the target pressure when the pressure increasing judging portion does not judge that the actual pressure is out of the allowable range and is smaller than the target pressure.

4. A vehicle brake device comprising:

a hydraulic pressure brake device which controls a hydraulic pressure braking force by controlling an actual pressure so that a deviation between a target pressure and the actual pressure becomes within an allowable range when the deviation is out of the allowable range and maintaining the actual pressure when the deviation is within the allowable range; and a regeneration brake device for generating a regeneration braking force, wherein a required braking force is generated by using both the regeneration braking force and the hydraulic pressure braking force, the hydraulic pressure brake device including:

a timing judging portion for judging whether or not a time is a timing of raising;

a requirement increasing judging portion for judging whether or not the required braking force is increasing;

a selecting portion for selecting a raising amount set according to a value or values selected from a first value relating to the allowable range, a second value relating to a response delay by filling a wheel cylinder with the operating fluid and a third value relating to a control delay relative to an electromagnetic valve which controls the hydraulic pressure braking force to the target pressure corresponding to a judgment result by the requirement increasing judging portion; and a raising control portion for adding the raising amount selected by the selecting portion to the target pressure when the timing judging portion judges that the time is the timing of raising.

5. The vehicle brake device according to claim 4, wherein the raising control portion adds the raising amount set to the second value to the target pressure when the requirement increasing judging portion judges that the required braking force is increasing and adds the raising amount which at least includes the first value to the target pressure when the requirement increasing judging portion does not judge that the required braking force is increasing.

6. The vehicle brake device according to claim 4, wherein the raising control portion does not add the raising amount to the target pressure when the requirement increasing judging portion judges that the required braking force is increasing and adds the raising amount including at least the first value to the target pressure when the requirement increasing judging portion does not judge that the required braking force is increasing.

7. A vehicle brake device comprising:

a hydraulic pressure brake device for controlling a hydraulic pressure braking force by controlling an actual pressure so that a deviation between a target pressure and the actual pressure becomes within an allowable range when the deviation is out of the allowable range and maintaining the actual pressure when the deviation is within the allowable range; and a regeneration brake device for generating a regeneration braking force, wherein a required braking force is generated by using both the regeneration braking force and the hydraulic pressure braking force, the hydraulic pressure brake device including:

a timing judging portion for judging whether or not a time is a timing of raising;

a calculating portion for calculating a raising amount by summing a first value relating to the allowable range, a second value relating to a response delay by filling a wheel cylinder with the operating fluid and a third value relating to a control delay relative to an electromagnetic valve which controls the hydraulic pressure braking force; and a raising control portion for adding the raising amount calculated by the calculating portion to the target pressure when the timing judging portion judges that the time is the timing of raising.

* * * * *